(12) United States Patent
Sonnathi et al.

(10) Patent No.: US 11,777,401 B2
(45) Date of Patent: Oct. 3, 2023

(54) FAULT TOLERANT AC-DC CHAIN-LINK CONVERTER

(71) Applicant: GENERAL ELECTRIC TECHNOLOGY GMBH, Baden (CH)

(72) Inventors: Chandra Mohan Sonnathi, Staffordshire (GB); Radnya Anant Mukhedkar, Staffordshire (GB); Rajaseker Reddy Ginnareddy, Staffordshire (GB)

(73) Assignee: General Electric Technology GmbH, Baden (CH)

( * ) Notice: Subject to any disclaimer, the term of this patent is extended or adjusted under 35 U.S.C. 154(b) by 331 days.

(21) Appl. No.: 16/982,472

(22) PCT Filed: Mar. 7, 2019

(86) PCT No.: PCT/EP2019/055773
§ 371 (c)(1),
(2) Date: Jun. 2, 2021

(87) PCT Pub. No.: WO2019/179787
PCT Pub. Date: Sep. 26, 2019

(65) Prior Publication Data
US 2022/0109364 A1 Apr. 7, 2022

(51) Int. Cl.
*H02M 1/32* (2007.01)
*H02M 7/48* (2007.01)
(Continued)

(52) U.S. Cl.
CPC ............ *H02M 1/32* (2013.01); *H02M 1/325* (2021.05); *H02M 7/125* (2013.01);
(Continued)

(58) Field of Classification Search
CPC ........ H02M 1/32; H02M 1/325; H02M 7/125; H02M 7/217; H02M 7/2173
See application file for complete search history.

(56) References Cited

U.S. PATENT DOCUMENTS

2011/0163702 A1  7/2011  Dommaschk et al.

FOREIGN PATENT DOCUMENTS

| CN | 102064555 A | * | 5/2011 |
| CN | 102355154 A | * | 2/2012 |

(Continued)

OTHER PUBLICATIONS

International Search Report of PCT/EP2019/055773 dated May 9, 2019.
(Continued)

*Primary Examiner* — Kyle J Moody
*Assistant Examiner* — Jye-June Lee
(74) *Attorney, Agent, or Firm* — Eversheds Sutherland (US) LLP (57) ABSTRACT

A converter including a first terminal and a second terminal, the first terminal configured for connection to a first network, the second terminal configured for connection to a second network; at least one switching module arranged to interconnect the first terminal and the second terminal, the switching module including at least one module switching element and at least one energy storage device, the module switching element and the energy storage device arranged to be combinable to selectively provide a voltage source, the switching module switchable to control a transfer of power between the first and second networks; the switching module including a discharge circuit, the discharge circuit including a discharge switching element and a discharge resistor, the discharge switching element switchable to switch the corresponding discharge resistor into and out of the correspond- (Continued)

ing switching module; and a controller configured to selectively control the switching of the discharge switching element.

14 Claims, 5 Drawing Sheets

(51) Int. Cl.
  *H02M 7/483* (2007.01)
  *H02M 7/217* (2006.01)
  *H02M 7/12* (2006.01)
(52) U.S. Cl.
  CPC ........... *H02M 7/2173* (2013.01); *H02M 7/48* (2013.01); *H02M 7/483* (2013.01); *H02M 7/4835* (2021.05)

(56) References Cited

FOREIGN PATENT DOCUMENTS

| | | | | |
|---|---|---|---|---|
| CN | 102355154 A | | 2/2012 | |
| CN | 106031009 A | * | 10/2016 | ............ H01M 1/32 |
| CN | 108111007 A | * | 6/2018 | ............ H01M 1/32 |
| EP | 2913925 A1 | | 9/2015 | |

OTHER PUBLICATIONS

European Search Report for Application No. 18163109.4 dated Sep. 7, 2018.

\* cited by examiner

FAULT TOLERANT AC-DC CHAIN-LINK CONVERTER

CROSS-REFERENCE TO RELATED APPLICATIONS

This application is a U.S. National Stage Application under 35 U.S.C. 371 and claims the priority benefit of International Application No. PCT/EP2019/055773 filed Mar. 7, 2019, which claims priority to EP18163109.4, filed Mar. 21, 2018, which are both incorporated herein by reference.

This invention relates to a converter for transferring power between first and second networks, preferably for use in high voltage direct current (HVDC) transmission.

In HVDC power transmission networks alternating current (AC) power is typically converted to direct current (DC) power for transmission via overhead lines, under-sea cables and/or underground cables. This conversion removes the need to compensate for the AC capacitive load effects imposed by the power transmission medium, i.e. the transmission line or cable, and reduces the cost per kilometre of the lines and/or cables, and thus becomes cost-effective when power needs to be transmitted over a long distance.

The conversion between DC power and AC power is utilized in power transmission networks where it is necessary to interconnect the DC and AC networks. In any such power transmission network, converters are required at each interface between AC and DC power to effect the required conversion from AC to DC or from DC to AC.

According to an aspect of the invention, there is provided a converter comprising:

a first terminal and a second terminal, the first terminal configured for connection to a first network, the second terminal configured for connection to a second network;

at least one switching module arranged to interconnect the first terminal and the second terminal, the or each switching module including at least one module switching element and at least one energy storage device, the or each module switching element and the or each energy storage device in the or each switching module arranged to be combinable to selectively provide a voltage source, the or each switching module switchable to control a transfer of power between the first and second networks;

the or each switching module including a discharge circuit, the or each discharge circuit including a discharge switching element and a discharge resistor, the or each discharge switching element switchable to switch the corresponding discharge resistor into and out of the corresponding switching module; and a controller configured to selectively control the switching of the or each discharge switching element in:

a normal mode to switch the corresponding discharge resistor into the corresponding switching module at a first switch-in voltage level of the or each corresponding energy storage device during a normal operating state of the converter so that a normal operating current flowing in the corresponding switching module is divided between the corresponding discharge resistor and the or each corresponding energy storage device, the or each first switch-in voltage level being lower than a voltage level corresponding to a maximum voltage capacity of the or each corresponding energy storage device; and a fault mode to switch the corresponding discharge resistor into the corresponding switching module at a second switch-in voltage level of the or each corresponding energy storage device during a fault operating state of the converter so that a fault current flowing in the corresponding switching module is divided between the corresponding discharge resistor and the or each corresponding energy storage device, wherein the or each second switch-in voltage level is lower than the corresponding first switch-in voltage level.

The configuration of the controller to perform the normal mode ensures that the or each energy storage device stays below the voltage level corresponding to its maximum voltage capacity, thus resulting in a safe and reliable converter operation. The first switch-in voltage level is preferably kept as high as possible so as to prevent accidental triggering of the normal mode during the normal operating state of the converter due to variations in the amount of energy stored in the or each energy storage device.

During the fault operating state of the converter, a fault current may flow in the converter so as to charge one or more energy storage devices such that the converter experiences a fault voltage which is higher than its normal operating voltage. In order to keep the fault voltage within the voltage rating of the energy storage device(s), it is necessary for the energy storage device(s) to have a sufficient energy storage capacity to accommodate the charging operation arising from the flow of the fault current in the converter.

By dividing the flow of the fault current between the or each discharge resistor and the or each energy storage device in the fault mode, the rate of charging of the energy storage device(s) is slower, which limits the voltage of the or each energy storage device in the fault mode and thereby effectively reduces the required amount of energy storage capacity to accommodate the charging operation arising from the flow of the fault current in the converter. This in turn permits reductions in the size and footprint of the converter, which provides benefits in terms of cost savings, lower losses, and smaller cooling hardware requirements.

Using the or each second switch-in voltage level, instead of the or each first switch-in voltage level, to trigger the fault mode beneficially enables part of the fault current to be diverted to the or each discharge resistor at a lower voltage level to provide a more efficient and reliable way of reducing the charging of the or each energy storage device during the fault operating state of the converter, while retaining the use of the or each higher first switch-in voltage level to prevent accidental triggering of the normal mode during the normal operating state of the converter.

The configuration of the controller to switch the or each discharge resistor into the corresponding switching module at the second switch-in voltage level of the or each corresponding energy storage device in the fault mode therefore enables the optimisation of the energy storage capacity of the energy storage device(s) without compromising on the ability of the converter to operate efficiently and reliably in its normal and fault operating states.

The optimal value of each switch-in voltage level depends on converter configuration and fault current characteristics.

The or each switching module may vary in configuration so long as the or each switching module is capable of performing a switching function to control a transfer of power between the first and second networks.

The or each switching module in the converter may vary in configuration.

In a first exemplary configuration of a switching module, the or each module switching element and the or each energy storage device in the switching module may be arranged to be combinable to selectively provide a unidirectional voltage source. For example, the switching module may include a pair of module switching elements connected in parallel with an energy storage device in a half-bridge arrangement to define a 2-quadrant unipolar module that can provide zero or positive voltage and can conduct current in two directions.

In a second exemplary configuration of a switching module, the or each module switching element and the or each energy storage device in the switching module may be arranged to be combinable to selectively provide a bidirectional voltage source. For example, the switching module may include two pairs of module switching elements connected in parallel with an energy storage device in a full-bridge arrangement to define a 4-quadrant bipolar module that can provide negative, zero or positive voltage and can conduct current in two directions.

In a preferred embodiment of the invention, the converter may include a plurality of switching modules.

As mentioned above, the configuration of the controller to switch the or each discharge resistor into the corresponding switching module at the second switch-in voltage level of the or each corresponding energy storage device in the fault mode enables the optimisation of the energy storage capacity of the energy storage device(s), and therefore enables the optimisation of the number of switching modules in the converter to provide savings in terms of converter size and footprint as well as cost savings, lower losses, and smaller cooling hardware requirements, without compromising on the ability of the converter to operate efficiently and reliably in its normal and fault operating states.

A plurality of switching modules may be connected in series to define a chain-link converter. The structure of the chain-link converter permits build-up of a combined voltage across the chain-link converter, which is higher than the voltage available from each of its individual switching modules, via the insertion of the energy storage devices of multiple switching modules, each providing its own voltage, into the chain-link converter. In this manner switching of the or each module switching element in each switching module causes the chain-link converter to provide a stepped variable voltage source, which permits the generation of a voltage waveform across the chain-link converter using a step-wise approximation. As such the chain-link converter is capable of providing a wide range of complex voltage waveforms.

At least one switching element may include at least one self-commutated switching device. The or each self-commutated switching device may be an insulated gate bipolar transistor, a gate turn-off thyristor, a field effect transistor, an injection-enhanced gate transistor, an integrated gate commutated thyristor or any other self-commutated switching device. The number of switching devices in each switching element may vary depending on the required voltage and current ratings of that switching element.

At least one switching element may further include a passive current check element that is connected in anti-parallel with the or each switching device. The or each passive current check element may include at least one passive current check device. The or each passive current check device may be any device that is capable of limiting current flow in only one direction, e.g. a diode. The number of passive current check devices in each passive current check element may vary depending on the required voltage and current ratings of that passive current check element.

Each energy storage device may be any device that is capable of storing and releasing energy to selectively provide a voltage, e.g. a capacitor, fuel cell or battery.

In the invention, the or each first switch-in voltage level in the normal mode may range from the normal operating voltage level of the or each corresponding energy storage device to a voltage level lower than a maximum voltage capacity of the or each corresponding energy storage device.

In the invention, the or each second switch-in voltage level in the fault mode may range from the normal operating voltage level of the or each corresponding energy storage device to a voltage level lower than a maximum voltage capacity of the or each corresponding energy storage device, as long as the or each second switch-in voltage level is lower than the corresponding first switch-in voltage level.

Preferably the or each first switch-in voltage level is higher than the normal operating voltage level of the or each corresponding energy storage device. More preferably the or each first switch-in voltage level is higher than a target average operating voltage level of the or each corresponding energy storage device. Configuring the or each first switch-in voltage level in this manner ensures that each switch-in voltage level does not interfere with the normal operation of the or each switching module to control a transfer of power between the first and second networks.

In embodiments of the invention, the controller may be configured to selectively control the switching of the or each discharge switching element in the normal mode to switch the corresponding discharge resistor out of the corresponding switching module at a first switch-out voltage level of the or each corresponding energy storage device during the normal operating state of the converter, the or each first switch-out voltage level being lower than the corresponding first switch-in voltage level. The or each first switch-out voltage level may be lower than the corresponding first switch-in voltage level by a voltage hysteresis amount.

In further embodiments of the invention, the controller may be configured to selectively control the switching of the or each discharge switching element in the fault mode to switch the corresponding discharge resistor out of the corresponding switching module at a second switch-out voltage level of the or each corresponding energy storage device during the fault operating state of the converter, the or each second switch-out voltage level being lower than the corresponding second switch-in voltage level. The or each second switch-out voltage level may be lower than the corresponding second switch-in voltage level by a voltage hysteresis amount.

The optimal value of the or each switch-out voltage level will depend on converter configuration and fault current characteristics.

Preferably the or each first switch-out voltage level is higher than the normal operating voltage level of the or each corresponding energy storage device. More preferably the or each first switch-out voltage level is higher than the target average operating voltage level of the or each corresponding energy storage device. Configuring each switch-out voltage level in this manner ensures that each switch-out voltage level does not interfere with the normal operation of the or each switching module to control a transfer of power between the first and second networks.

The converter may include a single first terminal or a plurality of first terminals. The converter may include a single second terminal or a plurality of second terminals.

The or each first terminal may be a DC terminal. The or each second terminal may be an AC terminal.

When the first terminal defines a DC terminal, the controller may be configured to selectively control the switching of the or each discharge switching element in a DC side fault mode to switch the corresponding discharge resistor into the corresponding switching module at a DC side fault switch-in voltage level of the or each corresponding energy storage device during a DC side fault operating state of the converter so that a fault current flowing in the corresponding switching module is divided between the corresponding discharge resistor and the or each corresponding energy storage device.

In such embodiments, the controller may be configured to selectively control the switching of the or each discharge switching element in the DC side fault mode to switch the corresponding discharge resistor out of the corresponding switching module at a DC side fault switch-out voltage level of the or each corresponding energy storage device during the DC side fault operating state of the converter, the or each DC side fault switch-out voltage level being lower than the corresponding DC side fault switch-in voltage level. The or each DC side switch-out voltage level may be lower than the corresponding DC side switch-in voltage level by a voltage hysteresis amount.

This allows the fault mode to be optimised for a DC side fault of the converter.

When the second terminal defines an AC terminal, the controller may be configured to selectively control the switching of the or each discharge switching element in an AC side fault mode to switch the corresponding discharge resistor into the corresponding switching module at an AC side switch-in voltage level of the or each corresponding energy storage device during an AC side fault operating state of the converter so that a fault current flowing in the corresponding switching module is divided between the corresponding discharge resistor and the or each corresponding energy storage device.

In such embodiments, the controller may be configured to selectively control the switching of the or each discharge switching element in the AC side fault mode to switch the corresponding discharge resistor out of the corresponding switching module at an AC side fault switch-out voltage level of the or each corresponding energy storage device during the AC side fault operating state of the converter, the or each AC side fault switch-out voltage level being lower than the corresponding AC side fault switch-in voltage level. The or each AC side switch-out voltage level may be lower than the corresponding AC side switch-in voltage level by a voltage hysteresis amount.

This allows the fault mode to be optimised for an AC side fault of the converter.

It will be understood that the or each DC side fault switch-in voltage level in the DC side fault mode may be the same as, or different from, the or each AC side fault switch-in voltage level in the AC side fault mode. It will also be understood that the or each DC side fault switch-out voltage level in the DC side fault mode may be the same as, or different from, the or each AC side fault switch-out voltage level in the AC side fault mode.

The configuration of the converter may vary depending on the requirements of the power transfer between the first and second networks.

In embodiments of the invention, the converter may include at least one converter limb and a plurality of switching modules, the or each converter limb extending between a pair of first terminals defining first and second DC terminals, the or each converter limb including first and second limb portions separated by a second terminal defining an AC terminal, each limb portion including at least one of the switching modules.

In a preferred embodiment of the invention, the converter includes three converter limbs, each of which is connectable via the respective AC terminal to a respective phase of a three-phase AC network. It will be appreciated that the converter may include a different number of converter limbs, each of which is connectable via the respective AC terminal to a respective phase of an AC network with the corresponding number of phases.

When the converter includes a plurality of converter limbs, the fault operating state of the converter may correspond to an occurrence of a fault in one or some of the plurality of converter limbs.

In further embodiments of the invention, the controller may be configured to selectively control the switching of the or each switching module to block the converter prior to the control of the switching of the or each discharge switching element in the fault mode to switch the corresponding discharge resistor into the corresponding switching module.

It will also be appreciated that the use of the terms "first" and "second", and the like, in this patent specification is merely intended to help distinguish between similar features (e.g. the first and second limb portions), and is not intended to indicate the relative importance of one feature over another feature, unless otherwise specified.

A preferred embodiment of the invention will now be described, by way of a non-limiting example, with reference to the accompanying drawings in which.

The figures are not necessarily to scale, and certain features and certain views of the figures may be shown exaggerated in scale or in schematic form in the interests of clarity and conciseness.

The following embodiment of the invention is used primarily in HVDC applications, but it will be appreciated that the following embodiment of the invention is applicable mutatis mutandis to other applications operating at different voltage levels.

Figure 1:
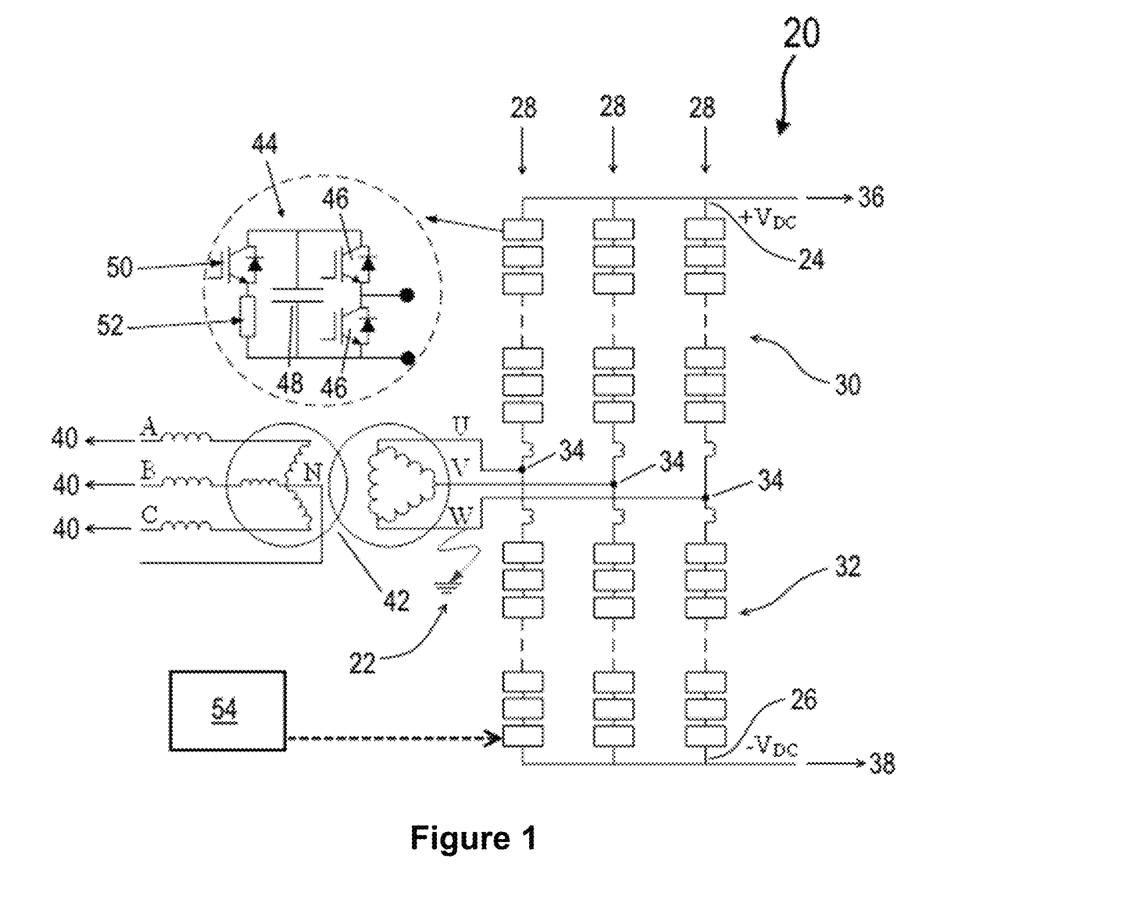
FIG. 1 shows schematically a voltage source converter according to an embodiment of the invention.

A voltage source converter 20 according to an embodiment of the invention is shown in FIG. 1.

The voltage source converter 20 includes first and second DC terminals 24,26 and a plurality of converter limbs 28. Each converter limb 28 extends between the first and second DC terminals 24,26 and includes first and second limb portions 30,32 separated by a respective AC terminal 34. In each converter limb 28, the first limb portion 30 extends between the first DC terminal 24 and the AC terminal 34, while the second limb portion 32 extends between the second DC terminal 26 and the AC terminal 34.

In use, the first and second DC terminals 24,26 of the voltage source converter 20 are respectively connected to first and second DC power transmission media 36,38 connected to a DC network. In use, the AC terminal 34 of each converter limb 28 of the voltage source converter 20 is connected to a respective AC phase of a three-phase AC network 40 via a star-delta transformer arrangement 42 and a respective AC circuit interruption device (not shown) in the form of an AC circuit breaker. There is also provided a control unit (not shown) for operating the AC circuit breakers to open or close.

It is envisaged that, in other embodiments of the invention, the transformer arrangement may be a star-star transformer arrangement. In such embodiments, the star-star transformer arrangement may have either or both of its neutral points grounded via any active or passive electrical element. An active electrical element may be or may include, for example, a power electronic-based component. A passive electrical element may be or may include, for example, a resistor, an inductor, a capacitor, a combination of any two of the resistor, inductor and capacitor, or a combination of all three of the resistor, inductor and capacitor.

Each limb portion 30,32 includes a chain-link converter that is defined by a plurality of series-connected switching modules 44. FIG. 1 shows schematically the structure of each switching module 44.

Each switching module 44 includes a pair of module switching elements 46 and a capacitor 48. The pair of module switching elements 46 are connected in parallel with the capacitor 48 in a half-bridge arrangement to define a 2-quadrant unipolar module that can provide zero or positive voltage and can conduct current in both directions.

Each module switching element 46 is in the form of an insulated gate bipolar transistor (IGBT) which is connected in parallel with an anti-parallel diode.

It is envisaged that, in other embodiments of the invention, each IGBT may be replaced by a gate turn-off thyristor, a field effect transistor, an injection-enhanced gate transistor, an integrated gate commutated thyristor or any other self-commutated semiconductor device. It is also envisaged that, in other embodiments of the invention, each diode may be replaced by a plurality of series-connected diodes.

The capacitor 48 of each switching module 44 is selectively bypassed or inserted into the corresponding chain-link converter by changing the states of the module switching elements 46. This selectively directs current through the capacitor 48 or causes current to bypass the capacitor 48, so that the switching module 44 provides a zero or positive voltage.

The capacitor 48 of the switching module 44 is bypassed when the module switching elements 46 in the switching module 44 are configured to form a short circuit in the switching module 44, whereby the short circuit bypasses the capacitor 48. This causes current in the corresponding chain-link converter to pass through the short circuit and bypass the capacitor 48, and so the switching module 44 provides a zero voltage, i.e. the switching module 44 is configured in a bypassed mode.

The capacitor 48 of the switching module 44 is inserted into the corresponding chain-link converter when the module switching elements 46 in the switching module 44 are configured to allow the current in the corresponding chain-link converter to flow into and out of the capacitor 48. The capacitor 48 then charges or discharges its stored energy so as to provide a positive voltage, i.e. the switching module 44 is configured in a non-bypassed mode.

In this manner the module switching elements 46 in each switching module 44 are switchable to control flow of current through the corresponding capacitor 48.

It is possible to build up a combined voltage across each chain-link converter, which is higher than the voltage available from each of its individual switching modules 44, via the insertion of the capacitors of multiple switching modules 44, each providing its own voltage, into each chain-link converter. In this manner switching of the module switching elements 46 in each switching module 44 causes each chain-link converter to provide a stepped variable voltage source, which permits the generation of a voltage waveform across each chain-link converter using a step-wise approximation. Hence, the module switching elements 46 in each limb portion 30,32 are switchable to selectively permit and inhibit flow of current through the corresponding capacitor 48 in order to control a voltage across the corresponding limb portion 30,32.

It is envisaged that, in other embodiments of the invention, each switching module 44 may be replaced by another type of switching module, which includes a plurality of module switching elements and at least one energy storage device, the plurality of module switching elements and the or each energy storage device in each such switching module being arranged to be combinable to selectively provide a voltage source.

It is also envisaged that, in other embodiments of the invention, the capacitor 48 in each switching module 44 may be replaced by another type of energy storage device which is capable of storing and releasing energy to provide a voltage, e.g. a battery or a fuel cell.

Each switching module 44 further includes a discharge circuit in the form of a series connection of a discharge switching element 50 and a discharge resistor 52. In each switching module 44, the series connection of the discharge switching element 50 and the discharge resistor 52 is connected in parallel with the capacitor 48 such that the discharge switching element 50 is switchable to switch the discharge resistor 52 into and out of the switching module 44.

It is envisaged that, in other embodiments of the invention, the discharge switching element and the discharge resistor may be arranged differently in the discharge circuit.

It is also envisaged that, in still other embodiments of the invention, the discharge circuit may include a different number of discharge switching elements and/or a different number of discharge resistors.

The voltage source converter 20 further includes a controller 54 programmed to control the switching of the module switching elements 46 and discharge switching elements 50.

Operation of the voltage source converter 20 is described as follows with reference to FIGS. 2 and 3.

In order to transfer power between the DC and AC networks 40, the controller 54 controls the switching of the module switching elements 46 of the switching modules 44 to switch the respective limb portions 30,32 into and out of circuit between the respective DC and AC terminals 24,26, 34 to interconnect the DC and AC networks 40. When a given limb portion 30,32 is switched into circuit between the respective DC and AC terminals 24,26,34, the controller 54 switches the module switching elements 46 of the switching modules 44 of the given limb portion 30,32 to provide a stepped variable voltage source and thereby generate a voltage waveform so as to control the configuration of an AC voltage waveform at the corresponding AC terminal 34 to facilitate the transfer of power between the DC and AC networks 40.

To generate a positive AC voltage component of an AC voltage waveform at the AC terminal 34 of a given converter limb 28, the first limb portion 30 is connected into circuit between the first DC terminal 24 and the corresponding AC terminal 34, and the second limb portion 40 is switched out of circuit between the second DC terminal 26 and the corresponding AC terminal. 34

To generate a negative AC voltage component of an AC voltage waveform at the AC terminal 34 of a given converter limb 28, the first limb portion 30 is switched out of circuit between the first DC terminal 24 and the corresponding AC terminal 34, and the second limb portion 32 is connected into circuit between the second DC terminal 26 and the corresponding AC terminal 34.

During a normal operating state of the voltage source converter 20, the controller 54 may selectively control the switching of the discharge switching elements 50 in a normal mode to switch one or more discharge resistors 52 into the corresponding switching module 44 at a first switch-in voltage level 56 of the corresponding capacitor 48 so that a normal operating current flowing in the corresponding switching module 44 is divided between the switched-in discharge resistor 52 and the corresponding capacitor 48. Each first switch-in voltage level 56 is set to be lower than a voltage level corresponding to a maximum voltage capacity of the corresponding capacitor 48. This ensures that each capacitor 48 stays below the voltage level corresponding to its maximum voltage capacity. Each first switch-in voltage level 56 is preferably kept as high as possible so as to prevent accidental triggering of the normal mode during the normal operating state of the voltage source converter 20 due to variations in the amount of energy stored in the capacitors 48.

After the voltage level Vc of the corresponding capacitor 48 drops to a first switch-out voltage level 58 by a voltage hysteresis amount h, the controller 54 controls the switching of the discharge switching elements 50 in the normal mode to switch the or each switched-in discharge resistor 52 out of the corresponding switching module 44 at the first switch-out voltage level 58 of the corresponding capacitor 48, so that the voltage source converter 20 can resume its normal power transfer operation.

A fault 22 may occur so as to result in a fault operating state of the voltage source converter 20 in which a fault current flows in the voltage source converter 20.

The invention will be exemplarily described with reference to an occurrence of a fault 22 in a phase associated with one of the converter limbs 28. In response to such a fault 22, the controller 54 controls the switching of the switching modules 44 of the converter limbs 28 so as to block the voltage source converter 20, which causes a fundamental frequency fault current to flow through the converter limbs 28 as to charge the capacitors 48 of their switching modules 44.

Depending on the nature of the fault, a DC side fault mode or an AC side fault mode will be carried out during a fault operating state of the voltage source converter 20.

FIG. 2(a) illustrates switch-in and switch-out voltage levels 60,62 of the AC side fault mode of the voltage source converter 20.

During the fault operating state of the voltage source converter 20 arising from an AC side fault of the voltage source converter 20, the controller 54 may selectively control the switching of the discharge switching elements 50 in the AC side fault mode to switch one or more discharge resistors 52 into the corresponding switching module 44 at an AC side fault switch-in voltage level 60 of the corresponding capacitor 48. By switching in the one or more discharge resistors 52 into the corresponding switching module(s) 44, the fault current is divided between the or each switched-in discharge resistor 52 and the corresponding capacitor(s) 48. This reduces the rate of charging of the corresponding capacitor(s) 48 during the fault operating state of the voltage source converter 20.

After the voltage level Vc of the corresponding capacitor 48 drops to an AC side switch-out voltage level 62 by a voltage hysteresis amount h, the controller 54 controls the switching of the discharge switching elements 50 in the normal mode to switch the or each switched-in discharge resistor 52 out of the corresponding switching module 44 at the AC side switch-out voltage level 62 of the corresponding capacitor 48.

FIG. 2(b) illustrates switch-in and switch-out voltage levels 64,66 of the DC side fault mode of the voltage source converter 20.

During the fault operating state of the voltage source converter 20 arising from a DC side fault of the voltage source converter 20, the controller 54 may selectively control the switching of the discharge switching elements 50 in the DC side fault mode to switch one or more discharge resistors 52 into the corresponding switching module 44 at a DC side fault switch-in voltage level 64 of the corresponding capacitor 48. By switching in the one or more discharge resistors 52 into the corresponding switching module(s) 44, the fault current is divided between the or each switched-in discharge resistor 52 and the corresponding capacitor(s) 48. This reduces the rate of charging of the corresponding capacitor(s) 48 during the fault operating state of the voltage source converter 20.

After the voltage level Vc of the corresponding capacitor 48 drops to a DC side switch-out voltage level 66 by a voltage hysteresis amount h, the controller 54 controls the switching of the discharge switching elements 50 in the normal mode to switch the or each switched-in discharge resistor 52 out of the corresponding switching module 44 at the DC side switch-out voltage level 66 of the corresponding capacitor 48.

The voltage hysteresis amounts h are selected to control the frequency of switching each discharge resistor 52 in and out of the corresponding switching module 44. Preferably the frequency of switching each discharge resistor 52 in and out of the corresponding switching module 44 is minimised. It will be appreciated that the various voltage hysteresis amounts h may be equal or different.

By dividing the flow of the fault current between the or each switched-in discharge resistor 52 and the corresponding capacitor(s) 48 in the fault mode, the rate of charging of the corresponding capacitor(s) 48 is reduced. This in turn has the effect of limiting the voltage(s) Vc of the corresponding capacitor(s) 48 in the fault mode, which effectively reduces the required amount of energy storage capacity to accommodate the charging operation arising from the flow of the fault current in the voltage source converter 20. This advantageously permits a reduction in the number of switching modules 44 to reduce the size and footprint of the voltage source converter 20, which provides benefits in terms of cost savings, lower losses, and smaller cooling hardware requirements.

Figure 4:
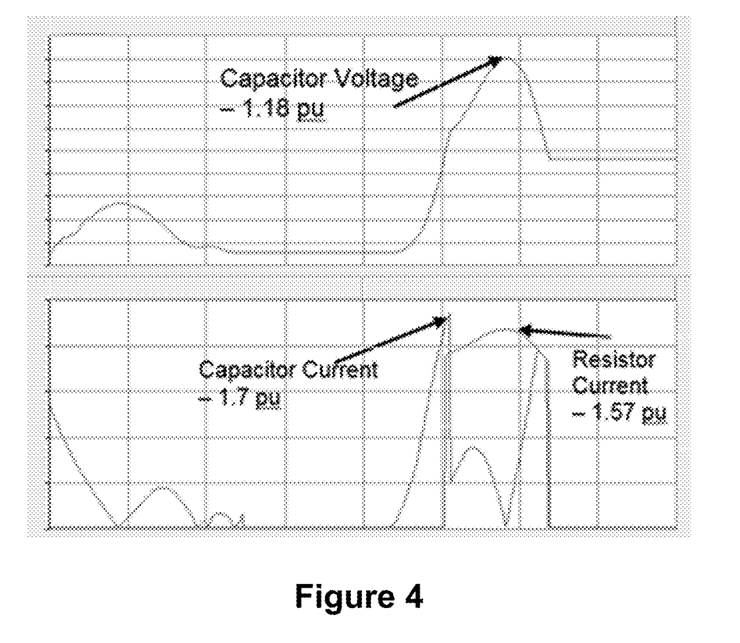
FIGS. 4 and 5 illustrate characteristics of switching modules of the voltage source converter of FIG. 1 when a fault mode is not carried out.
Figure 5:
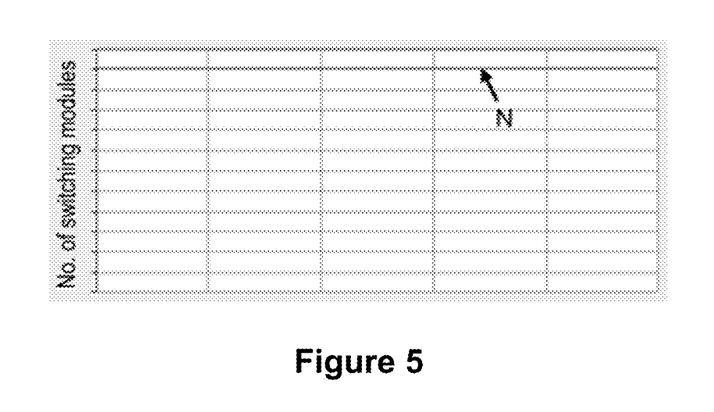
Figure 6:
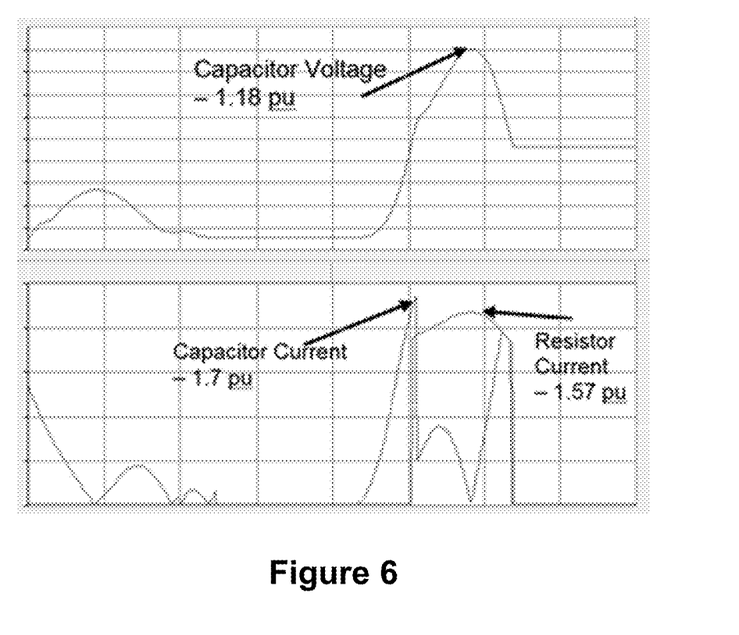
FIGS. 6 and 7 illustrate characteristics of switching modules of the voltage source converter of FIG. 1 when a fault mode is carried out.
Figure 7:
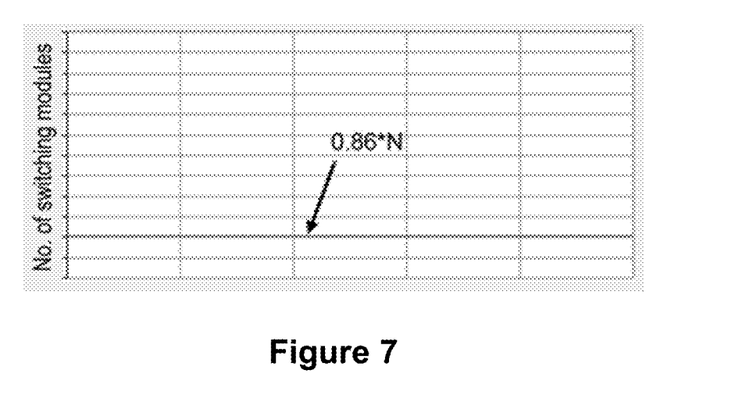

FIGS. 4 and 5 shows the characteristics of the switching modules 44 of the voltage source converter 20 when the fault mode is not carried out, while FIGS. 6 and 7 shows the characteristics of the switching modules 44 of the voltage source converter 20 when the fault mode is carried out.

In FIGS. 4 and 5, the switching of the discharge resistors 52 into and out of the corresponding switching modules 44 is carried out in accordance with the first switch-in and switch-out voltage levels 56,58 from the normal mode. It can be seen from FIGS. 4 and 5 that, following the occurrence of the fault and the ensuing switching of the discharge resistors 52 based on the normal mode, the voltage level Vc of the capacitor 48 settles at a peak voltage of approximately 1.18 per unit, and that the voltage source converter 20 is required to have N switching modules 44 per limb portion 30,32.

In FIGS. 6 and 7, the switching of the discharge resistors 52 into and out of the corresponding switching modules 44 is carried out in accordance with the switch-in and switch-out voltage levels 60,62,64,66 of the fault mode described hereinabove, which are lower than the first switch-in and switch-out voltage levels 56,58 from the normal mode. It can be seen from FIGS. 6 and 7 that, following the occurrence of the fault and the ensuing switching of the discharge resistors 52 based on the fault mode, the voltage level Vc of the capacitor 48 settles at a peak voltage of approximately 1.18 per unit, and that the voltage source converter 20 is required to have 86% of the N switching modules 44 per limb portion 30,32.

It is therefore apparent from the results in FIGS. 4 to 7 that the operation of the voltage source converter 20 in the fault mode during its fault operating state reduces the required amount of energy storage capacity to accommodate the charging operation arising from the flow of the fault current in the voltage source converter 20, and thereby permits a reduction in the required amount of switching modules 44 per limb portion 30,32.

Each of the AC side and DC side fault switch-in and switch-out voltage levels 60,62,64,66 is set to be lower than the first switch-in and switch-out voltage levels 56,58. This is so that the fault modes can be triggered at a voltage level that is lower than the first switch-in voltage level 56. This has the benefit of providing a more efficient and reliable way of reducing the charging of each capacitor 48 during the fault operating state of the voltage source converter 20, while retaining the use of the higher first switch-in voltage level 56 to prevent accidental triggering of the normal mode during the normal operating state of the voltage source converter 20.

It will be appreciated that, in this particular embodiment, each of the switch-in and switch-out voltage levels 56,58, 60,62,64,66 is higher than a target average operating voltage level 68 of each capacitor 48, so that each of the switch-in and switch-out voltage levels 56,58,60,62,64,66 do not interfere with the normal operation of the switching modules 44 to control a transfer of power between the DC and AC networks 40.

It is envisaged that, in other embodiments of the invention, the first switch-in voltage level in the normal mode may range from a normal operating voltage level of the corresponding capacitor to a voltage level lower than a maximum voltage capacity of the corresponding capacitor. It is also envisaged that, in still other embodiments of the invention, each switch-in voltage level in the fault mode may range from a normal operating voltage level of the corresponding capacitor to a voltage level lower than a maximum voltage capacity of the corresponding capacitor, as long as each switch-in voltage level in the fault mode is lower than the first switch-in voltage level in the normal mode. Each switch-out voltage level is set to be lower than its corresponding switch-in voltage level.

The DC side fault switch-in voltage level 64 in the DC side fault mode may be the same as, or different from, the AC side fault switch-in voltage level 60 in the AC side fault mode. The DC side fault switch-out voltage level 66 in the DC side fault mode may be the same as, or different from, the AC side fault switch-out voltage level 62 in the AC side fault mode. This will depend on the characteristics of the fault current in the voltage source converter 20 arising from the fault.

After the fault mode is carried out, a command may be dispatched to open AC circuit breakers operably connected to the AC terminals 34 of the voltage source converter 20.

It will be appreciated that the invention is applicable to voltage source converters connected to other types of transformer arrangements, including a star-star transformer arrangement as mentioned above, and is also applicable to symmetrical and asymmetrical voltage source converters configured for connection to symmetrical and asymmetrical monopole networks respectively.

Figure 2:
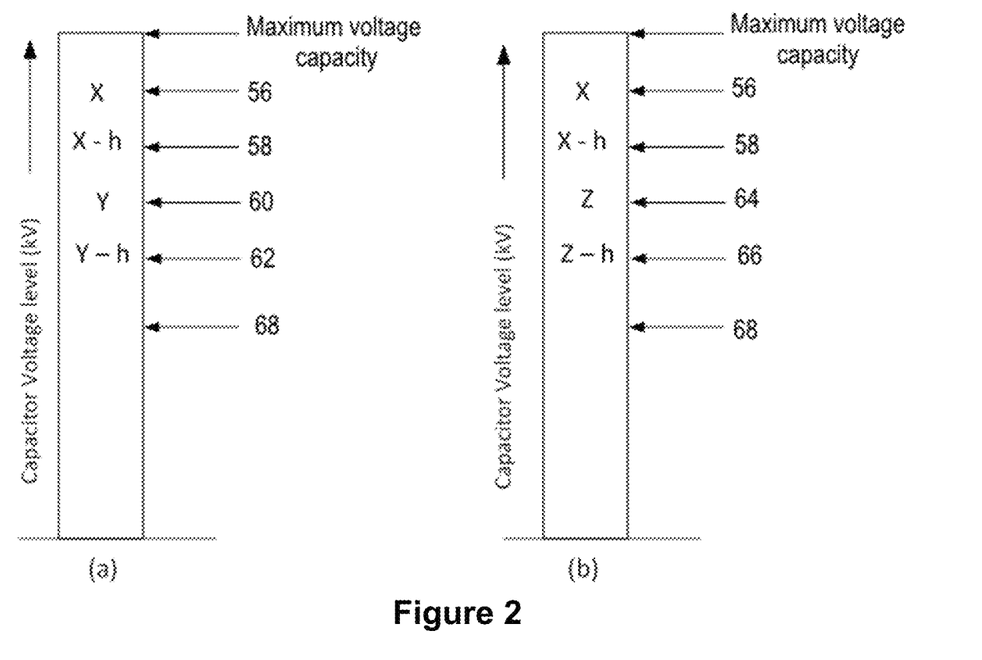
FIG. 2 illustrates switch-in and switch-out voltage levels of normal and fault modes of the voltage source converter of FIG. 1.
Figure 3:
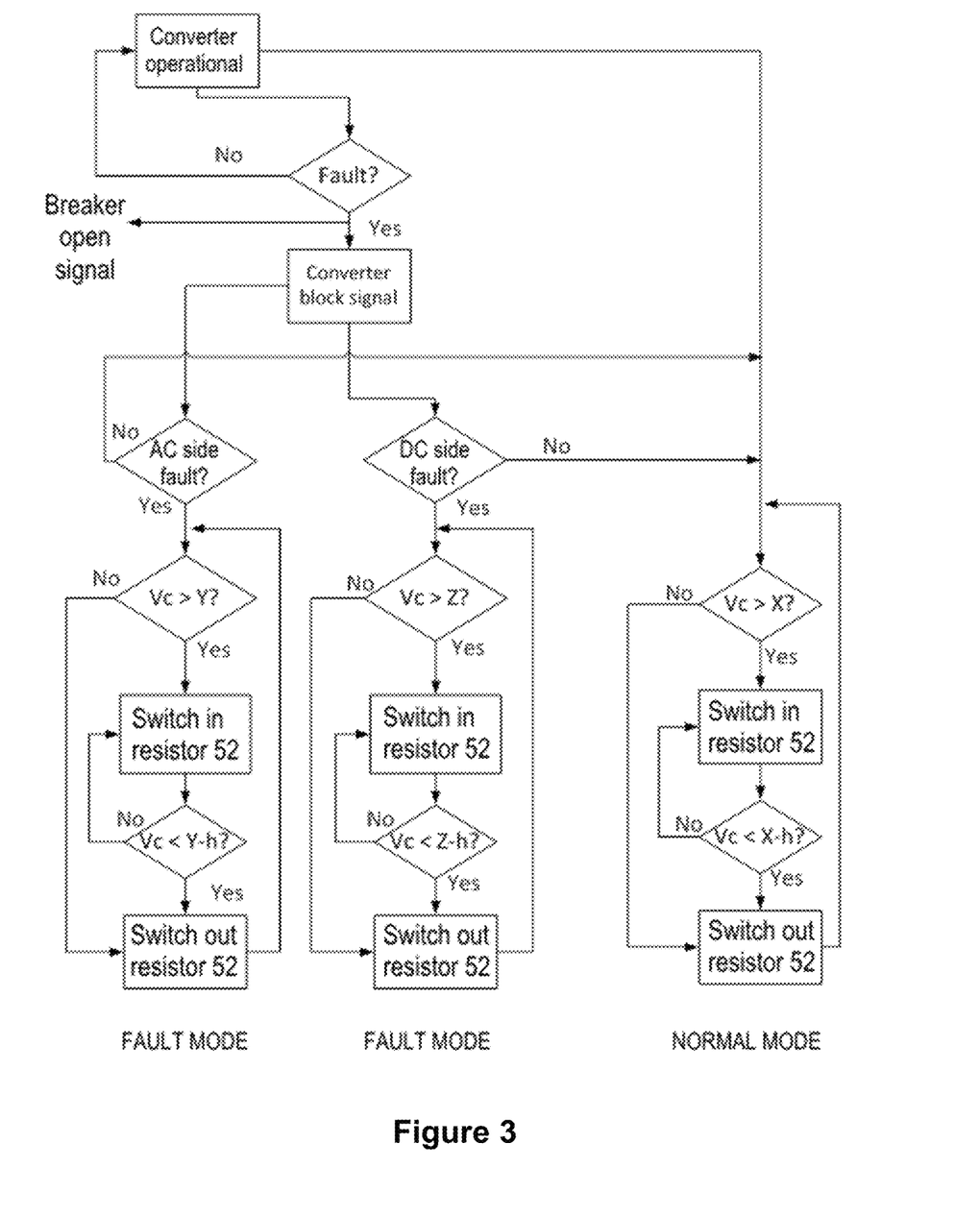
FIG. 3 illustrates a flow chart depicting normal and fault operations of the voltage source converter of FIG. 1.

It will also be appreciated that the switch-in and switch-out voltage levels 56,58,60,62,64,66 shown in FIG. 2 are merely intended as examples to illustrate the working of the invention, and the switch-in and switch-out voltage levels 56,58,60,62,64,66 may vary from what is shown in FIG. 2.

What is claimed is:

1. A converter comprising:
    a first terminal and a second terminal, the first terminal configured for connection to a first network, the second terminal configured for connection to a second network;
    at least one switching module arranged to interconnect the first terminal and the second terminal, the or each switching module including at least one module switching element and at least one energy storage device, the or each module switching element and the or each energy storage device in the or each switching module arranged to be combinable to selectively provide a voltage source, the or each switching module switchable to control a transfer of power between the first and second networks;
    the or each switching module including a discharge circuit, the or each discharge circuit including a discharge switching element and a discharge resistor, the or each discharge switching element switchable to switch the corresponding discharge resistor into and out of the corresponding switching module; and
    a controller configured to selectively control the switching of the or each discharge switching element in:
    a normal mode to switch the corresponding discharge resistor into the corresponding switching module at a first switch-in voltage level of the or each corresponding energy storage device during a normal operating state of the converter so that a normal operating current flowing in the corresponding switching module is divided between the corresponding discharge resistor and the or each corresponding energy storage device, wherein the or each first switch-in voltage level is lower than a voltage level corresponding to a maximum voltage capacity of the or each corresponding energy storage device; and
    a fault mode to switch the corresponding discharge resistor into the corresponding switching module at a second switch-in voltage level of the or each corresponding energy storage device during a fault operating state of the converter so that a fault current flowing in the corresponding switching module is divided between the corresponding discharge resistor and the or each corresponding energy storage device, wherein the or each second switch-in voltage level is lower than the corresponding first switch-in voltage level.

2. The converter according to claim 1, wherein the converter includes a plurality of switching modules.

3. The converter according to claim 1, wherein the or each first switch-in voltage level is higher than a normal operating voltage level of the or each corresponding energy storage device, and preferably wherein the or each first switch-in voltage level is higher than a target average operating voltage level of the or each corresponding energy storage device.

4. The converter according to claim 1, wherein the controller is configured to selectively control the switching of the or each discharge switching element in the normal mode to switch the corresponding discharge resistor out of the corresponding switching module at a first switch-out voltage level of the or each corresponding energy storage device during the normal operating state of the converter, the or each first switch-out voltage level being lower than the corresponding first switch-in voltage level.

5. The converter according to claim 4, wherein the or each first switch-out voltage level is higher than a normal operating voltage level of the or each corresponding energy storage device, and preferably wherein the or each first switch-out voltage level is higher than a target average operating voltage level of the or each corresponding energy storage device.

6. The converter according to claim 1, wherein the controller is configured to selectively control the switching of the or each discharge switching element in the fault mode to switch the corresponding discharge resistor out of the corresponding switching module at a second switch-out voltage level of the or each corresponding energy storage device during the fault operating state of the converter, the or each second switch-out voltage level being lower than the corresponding second switch-in voltage level.

7. The converter according to claim 1, wherein the first terminal defines a DC terminal, and the controller is configured to selectively control the switching of the or each discharge switching element in a DC side fault mode to switch the corresponding discharge resistor into the corresponding switching module at a DC side fault switch-in voltage level of the or each corresponding energy storage device during a DC side fault operating state of the converter so that a fault current flowing in the corresponding switching module is divided between the corresponding discharge resistor and the or each corresponding energy storage device.

8. The converter according to claim 7, wherein the controller is configured to selectively control the switching of the or each discharge switching element in the DC side fault mode to switch the corresponding discharge resistor out of the corresponding switching module at a DC side fault switch-out voltage level of the or each corresponding energy storage device during the DC side fault operating state of the converter, the or each DC side fault switch-out voltage level being lower than the corresponding DC side fault switch-in voltage level.

9. The converter according to claim 7, wherein the second terminal defines an AC terminal, and the controller is configured to selectively control the switching of the or each discharge switching element in an AC side fault mode to switch the corresponding discharge resistor into the corresponding switching module at an AC side switch-in voltage level of the or each corresponding energy storage device during an AC side fault operating state of the converter so that a fault current flowing in the corresponding switching module is divided between the corresponding discharge resistor and the or each corresponding energy storage device.

10. The converter according to claim 9, wherein the controller is configured to selectively control the switching of the or each discharge switching element in the AC side fault mode to switch the corresponding discharge resistor out of the corresponding switching module at an AC side fault switch-out voltage level of the or each corresponding energy storage device during the AC side fault operating state of the converter, the or each AC side fault switch-out voltage level being lower than the corresponding AC side fault switch-in voltage level.

11. The converter according to claim 9, wherein the or each DC side fault switch-in voltage level in the DC side fault mode is the same as, or different from, the or each AC side fault switch-in voltage level in the AC side fault mode.

12. The converter according to claim 1, wherein the converter includes at least one converter limb and a plurality of switching modules, the or each converter limb extending between a pair of first terminals defining first and second DC terminals, the or each converter limb including first and second limb portions separated by a second terminal defining an AC terminal, each limb portion including at least one of the plurality of switching modules.

13. The converter according to claim 12, wherein the converter includes a plurality of converter limbs, and the fault operating state of the converter corresponds to an occurrence of a fault in one or some of the plurality of converter limbs.

14. The converter according to claim 1, wherein the controller is configured to selectively control the switching of the or each switching module to block the converter prior to the control of the switching of the or each discharge switching element in the fault mode to switch the corresponding discharge resistor into the corresponding switching module.

* * * * *